(12) United States Patent
Arsac et al.

(10) Patent No.: US 9,799,227 B2
(45) Date of Patent: Oct. 24, 2017

(54) TEAM MANAGEMENT FOR A LEARNING MANAGEMENT SYSTEM

(71) Applicants: Wihem Arsac, Biot (FR); Elton Mathias, Nice (FR); Isabel Sammet, Ludwigshafen (DE); Gilles Montagnon, Mougins (FR)

(72) Inventors: Wihem Arsac, Biot (FR); Elton Mathias, Nice (FR); Isabel Sammet, Ludwigshafen (DE); Gilles Montagnon, Mougins (FR)

(73) Assignee: SAP SE, Walldorf (DE)

( * ) Notice: Subject to any disclaimer, the term of this patent is extended or adjusted under 35 U.S.C. 154(b) by 533 days.

(21) Appl. No.: 14/456,715

(22) Filed: Aug. 11, 2014

(65) Prior Publication Data
US 2016/0042653 A1 Feb. 11, 2016

(51) Int. Cl.
*G09B 5/08* (2006.01)
*G09B 7/00* (2006.01)

(52) U.S. Cl.
CPC ...... *G09B 5/08* (2013.01); *G09B 7/00* (2013.01)

(58) Field of Classification Search
CPC ....................................................... G09B 5/08
USPC ........................................................ 434/350
See application file for complete search history.

(56) References Cited

U.S. PATENT DOCUMENTS

| | | | |
|---|---|---|---|
| 2009/0035733 A1* | 2/2009 | Meitar ............... | G09B 7/00 434/118 |
| 2015/0106025 A1* | 4/2015 | Keller ............. | G06Q 10/101 702/19 |

* cited by examiner

*Primary Examiner* — Thomas Hong
(74) *Attorney, Agent, or Firm* — Brake Hughes Bellermann LLP

(57) ABSTRACT

A progression collector may collect, in conjunction with displayed learning context provided by a learning management system (LMS), first learner progression data of a first learner, and second learner progression data of a second learner. A team aggregator may aggregate the first learner progression data and the second learner progression data into team progression data, and may provide the team progression data to the LMS as virtual learner progression data. A rendering engine may receive progression results processed by the LMS for each of the first learner progression data, the second learner progression data, and the virtual learner progression data representing team progression results.

14 Claims, 5 Drawing Sheets

TEAM MANAGEMENT FOR A LEARNING MANAGEMENT SYSTEM

TECHNICAL FIELD

This description relates to electronic learning.

BACKGROUND

A learning management system (LMS) generally refers to software designed to provide computer-based learning, also known as e-learning. In the context of such computerized learning, or e-learning, the learning management system is typically deployed at a host or server computer, and is configured to provide desired learning content and related information to a learner or other user at a client computer. For example, the LMS may be deployed at a server computer, and may provide learning content and related information to a client computer by way of a computer network. Consequently, instruction may be provided to a large number of potentially disbursed learners, in a manner that is efficient, cost effective, and convenient for the various learners.

Historically, LMS software has been developed in a largely standardized fashion. That is, known standards and associated protocols have been developed and adopted on an industry-wide, or nearly industry-wide, basis. As a result, it is relatively straightforward for content developers to create and deploy learning-related content, or many different types of content, and for many different e-learning scenarios and contexts. Moreover, the developed content may easily and predictably leverage a wide array of standardized LMS features and functions, such as development tools, rendering tools, and reporting tools.

Notwithstanding the above-discussed advantages of e-learning, and other advantages, e-learning is often a solitary, and potentially lonely, endeavor. It may be difficult to maintain a desired level of interest or enthusiasm from many learners, particularly when the course work is mandatory, and is not related to a subject of innate interest of a given learner. Moreover, even if new techniques were developed for engaging individual learners more consistently, such techniques would not necessarily comply with existing LMS standards. As a result, such new techniques would either be difficult to adopt within the industry, and/or would not be able to take full advantage of available features and functions of existing LMS software.

SUMMARY

According to one general aspect, a system may include at least one processor, and instructions recorded on a non-transitory computer-readable medium, and executable by the at least one processor. The system may include a progression collector configured to collect, in conjunction with displayed learning context provided by a learning management system (LMS), first learner progression data of a first learner, and second learner progression data of a second learner. The system may include a team aggregator configured to aggregate the first learner progression data and the second learner progression data into team progression data, and further configured to provide the team progression data to the LMS as virtual learner progression data. The system also may include a rendering engine configured to receive progression results processed by the LMS for each of the first learner progression data, the second learner progression data, and the virtual learner progression data representing team progression results.

According to another general aspect, a computer-implemented method for executing instructions stored on a non-transitory computer readable storage medium may include collecting, in conjunction with displayed learning context provided by a learning management system (LMS), first learner progression data of a first learner, and second learner progression data of a second learner. The method also may include aggregating the first learner progression data and the second learner progression data into team progression data, providing the team progression data to the LMS as virtual learner progression data, and receiving progression results processed by the LMS for each of the first learner progression data, the second learner progression data, and the virtual learner progression data representing team progression results.

According to another general aspect, a computer program product, tangibly embodied on a non-transitory computer-readable storage medium, may include instructions that, when executed, may be configured to cause at least one processor to collect, in conjunction with displayed learning context provided by a learning management system (LMS), first learner progression data of a first learner, and second learner progression data of a second learner. The instructions, when executed, may be further configured to aggregate the first learner progression data and the second learner progression data into team progression data, provide the team progression data to the LMS as virtual learner progression data, and receive progression results processed by the LMS for each of the first learner progression data, the second learner progression data, and the virtual learner progression data representing team progression results.

The details of one or more implementations are set forth in the accompanying drawings and the description below. Other features will be apparent from the description and drawings, and from the claims.

DETAILED DESCRIPTION

Figure 1:
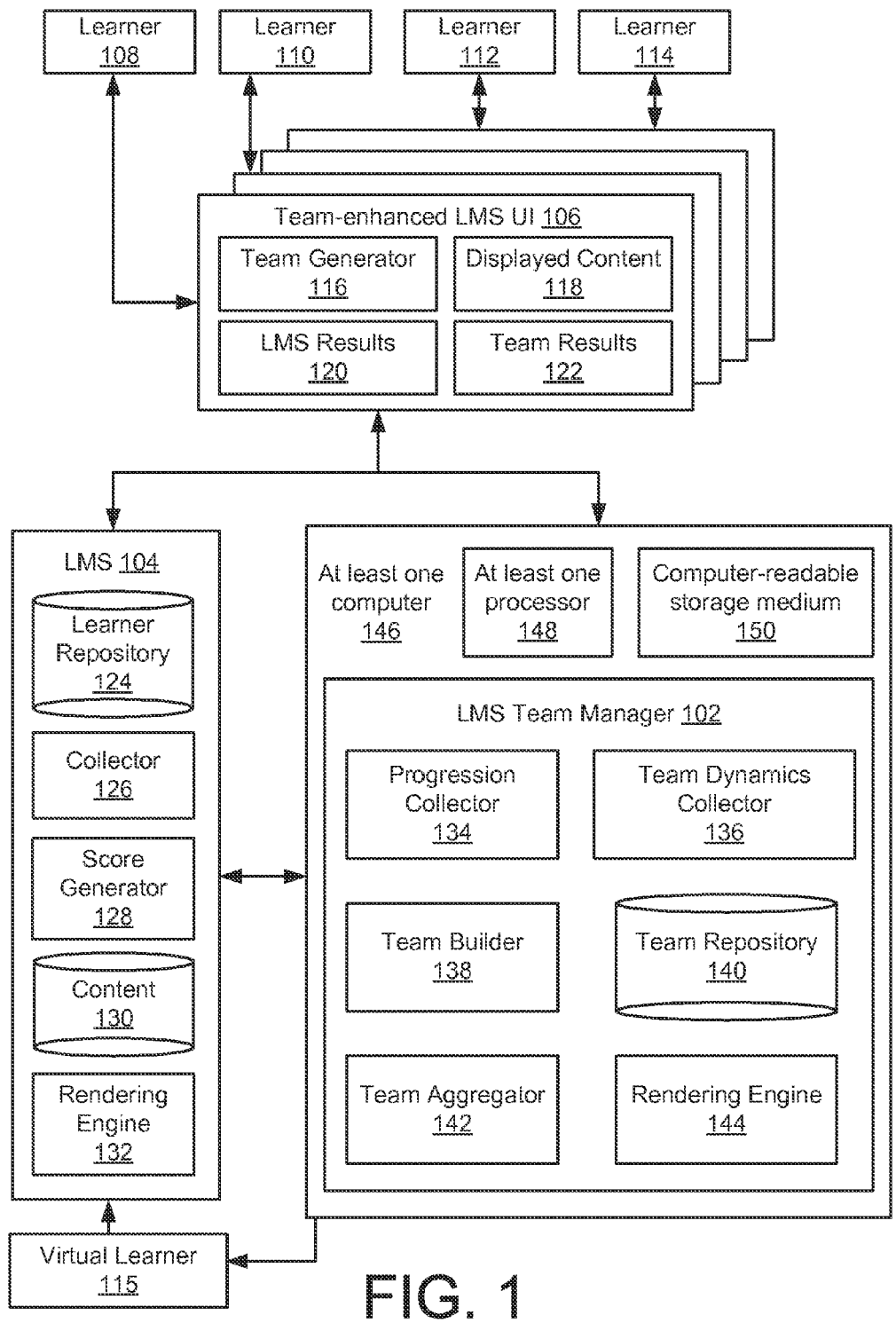
FIG. 1 is a block diagram of a system for team management for LMS software.

FIG. 1 is a block diagram of a system 100 for team management for LMS software. Specifically, in the example of FIG. 1, a LMS team manager 102 is in communication with a LMS 104, and configured to provide a team-enhanced LMS user interface (UI) 106. More specifically, and as described in detail below, the LMS team manager 102 may be configured to define and utilize one or more teams of available learners, represented in the example of FIG. 1 as learners 108, 110, 112, and 114. Through the use of such team management functions and features, levels of interest and enthusiasm of the individual learners 108-114 may be maintained or increased, such as when each individual learner 108-114 is motivated to outscore, together with his or her team, one or more other teams of learners managed by the LMS team manager 102. Moreover, the LMS team manager 102 may be configured to provide these and other advantages in a manner that fully utilizes and leverages available features and functions of the LMS 104, and that leverages available functionalities of the LMS 104 to fully utilize a benefit obtained from the types of team-related features.

More particularly, for each team and associated, calculated team progression metrics, a virtual learner 115 may be represented in a format that is compatible with any appropriate standard and associated protocol used by the LMS 104. In other words, the virtual learner 115 may be constructed by the LMS team manager 102 in a manner and format that is indistinguishable by the LMS 104 from any individual learner of the learners 108-114. Then, the virtual learner 115 is injected into the LMS 104, and treated therein essentially identically to the treatment received by any one of the learners 108-114. Thus, the LMS 104 is not required to be modified in any way in order to receive the virtual learner 115, representing a corresponding team. Thus, the LMS 104 may calculate a score and otherwise a progression of the virtual learner 115, and provide results therefore, in a standardized fashion. More specific techniques for the providing of the virtual learner 115 by the LMS team manager 102 are provided in detail, below.

In the example of FIG. 1, the LMS 104, as referenced above, illustrates and represents a software application for online education, which provides for the administration, documentation, tracking, reporting, and delivering of e-learning education and courses/training programs. Thus, the LMS 104, except as otherwise described herein, may be understood to represent generally any one of a number of current and future LMS software applications. As a result, detailed descriptions of aspects of such LMS software applications are not provided herein, except as may be necessary or helpful in understanding operations of the system 100 of FIG. 1.

As also referenced above, the LMS 104 is assumed to be standard-compliant, i.e., is assumed to comply with applicable standards and associated protocols. By way of specific example, the Shareable Content Object Reference Model (SCORM) may be used in conjunction with the implementation of the LMS 104. Of course, other LMS standards may additionally or alternatively be used, such as Aviation Industry Computer-based training (CBT) Committee (AICC), xAPI, (CMI-5), Common Cartridge and Learning Tool Interoperability standards (CC/LTI), or any other known or future LMS standard.

Through the use of such standards, and related functionality, the LMS 104 may be configured to provide learning content in a structured, predictable way, and to track individual progress of each learner 108-114 within the context of a predefined sequence or learning path. Then, as referenced above and described in more detail below, the LMS 104 may be configured to calculate or otherwise determine a performance of each learner 108-114 with respect to progressing through, and ultimately completing, the available, preconfigured learning path.

As also described in more detail below, the LMS 104 is capable of rendering a standard, conventional frontend UI, in which individual learners may view displayed content, submit test answers or other information, and ultimately receive applicable scores and other calculated information characterizing the learner's interaction with the LMS 104. Such conventional LMS UIs may even offer social features, such as communities or question/answer fields, however, such features are conventionally offered at the level of the sole/individual learner, without providing the type of team-based progression and other team-based learning features described herein.

In the example of FIG. 1, such conventional frontend UI features and aspects provided by the LMS 104 may be utilized by the LMS team manager 102 in rendering the team-enhanced UI 106. For example, as described in detail below, the LMS team manager 102 may be configured to blend UI features rendered by the LMS 104 with UI features generated by the LMS team manager 102, in a manner that is seamless and that provides the team-enhanced LMS UI 106 to the individual learners 108-114 in a convenient and integrated manner.

In operation, it should be apparent that individual instances of the team-enhanced LMS UI 106 are provided to corresponding individual learners 108-114. For example, each of the learners 108-114 may be located at a separate location, and each learner may have access to a client computer, and may utilize the available client computer, not specifically illustrated in the example of FIG. 1, to retrieve a corresponding instance of the team-enhanced LMS UI 106. Thus, although the team-enhanced LMS UI 106 illustrated in FIG. 1 is shown as including a number of components 116-122, it may be appreciated from the above description that a given instance of the team-enhanced LMS UI 106 accessed by a given learner of the learners 108-114 may not include, at a given point in time, all such components 116-122.

For example, a team generator 116 is illustrated that may be understood to represent one or more components associated with the functionality of enabling an authorized learner of the learners 108-114, or other administrator or user, to define or otherwise configure groups of learners as teams. For example, the learner 108 may be authorized to access the team generator 116, and may include the learner 108 and the learner 110 on a first team. Meanwhile, similarly, the learner 112 may also be authorized to access the team generator 116, and may configure a second team to include the learner 112 and the learner 114. In other example scenarios, learners may be grouped into teams automatically, e.g., based on known or determined characteristics of the individual learners 108-114, perhaps in conjunction with a current type of learning content being provided by the LMS 104.

Meanwhile, displayed content 118 simply refers to otherwise-conventional learning content that may be provided to individual ones of the learners 108-114. Of course, the various learners 108-114 may progress at different rates through defined learning paths for available content, so that the displayed content 118 within a given instance of the team-enhanced LMS UI 106, may thus vary in time, and may even vary to some extent in terms of included content (e.g., depending on a role or skill level of a corresponding learner).

Similarly, LMS results 120 represent scores and other calculated information determined based on input received from a corresponding learner. For example, typically, the displayed content 118 will include, or be associated with, interactive fields for receiving input from a corresponding learner. Thus, in a simple example, the learner 108 may answer a content-related question embedded within the displayed content 118, and the LMS results 120 may provide a corresponding, individual score of the learner 108 with respect to the answered question and related answer questions.

Then, in contrast to the LMS results 120, which are calculated and displayed with respect to a progression of an individual learner of the learners 108-114, team results 122 may include scores and other calculated information that have been aggregated by the LMS team manager 102 to provide group level results characterizing internal team dynamic and/or relative or objective metric characterizing a progression of one or more teams with respect to the displayed content 118. For example, team results may include scores and other progression metrics for the virtual learner 115, as calculated by the LMS 104, and/or may include other team-related progression metrics calculated by the LMS team manager 102 itself. Additional examples of the LMS results 120 and the team results 122 are described and illustrated below, e.g., with respect to FIGS. 3 and 4.

Thus, it may be appreciated that the illustrated architecture of FIG. 1 is operable to combine traditional LMS scoring features with group level features related to scoring, behavior, and other aspects of progressions of individual learners and defined teams of learners. In this way, for example, the illustrated architecture of the system 100 of FIG. 1 determines and displays group level, extended features (i.e., extended with respect to conventional, existing functions and features of the LMS 104), in order to engage the learners 108-114 in a manner designed to increase the likelihood that some or all of the learners 108-114 will be motivated to complete assigned or accepted course work. In this way, the learners 108-114 may be incentivized to perform at their respective highest level of ability, while still leveraging available features and functions of the LMS 104 in a manner that complies with any or all LMS standards implemented by the LMS 104.

In more detail, and as illustrated, the LMS 104 may include a number of components 124-132. Specifically, a learner repository 124 represents, for example, a database of all learners registered with the LMS 104, along with related information. For example, the learner repository 124 may include, for each learner, associated information such as a role, skill level, preference history, result/score history, authorization level, and any other useful information that may be stored at a level of an individual learner. As may be appreciated, the virtual learner 115 also may be included within the learner repository 124.

Meanwhile, a collector 126 represents a monitoring component that actively receives and catalogues answers and other input received from each of the learners 108-114. For example, the collector 126 may receive an answer to a test question from the learner 108, and may associate a timestamp or other contextual information with the received answer. Thus, the collector 126 captures content-related events that are necessary for knowledge completion and certification. At a designated time, and/or in response to a designated event, a score generator 128 may then precede to calculate individual scores and other derived performance characteristics.

Content 130 represents any learning content provided to the LMS 104 by an administrator or otherwise authorized user, for deployment thereof by the LMS 104. As described above, although a topical nature of the content 130 may vary widely, a format and structure of the content 130 may be standardized in accordance with applicable LMS standards, such as SCORM, so that the LMS 104 may administer and deploy learning content in a consistent manner that is agnostic to a topic of the learning content.

Thus, when considering the LMS 104 and the team-enhanced LMS UI 106 together, it is apparent that the content 130 is included within the displayed content 118, including interface elements for receiving input from a corresponding learner. The collector 126 collects this input, and the score generator 128 calculates the LMS results 120 based thereon.

In more detail, in the conventional context in which the LMS 104 is used on its own, a rendering engine 132 may be configured to render appropriate portions of the content 130 within the displayed content 118, and to render the LMS results 120 calculated by the score generator 128. For example, a rendering engine 132 may be configured to render the displayed content 118 and the LMS results 120 in hypertext markup language (HTML) format, or HTML-compatible format. For example, the SCORM standard is known to utilize extensible markup language (XML) documents to represent the content 130.

Thus, the LMS 104, by itself, is capable of providing remote instruction to any individual one of the learners 108-114. With the addition of the LMS team manager 102, as described, the system 100 of FIG. 1 provides an architecture that combines such conventional LMS techniques with metric for progressions of teams of learners through the same course material, including internal group dynamic that occur during the context of the team progression. Further, the LMS team manager 102 enables, as already described with respect to the team-enhanced LMS UI 106, a blended, seamless display of all such team-based metric, to thereby engage and motivate the various learners 108-114.

In more detail, and as illustrated in FIG. 1, the LMS team manager 102 may include a progression collector 134 that is operable to collect the same or similar progression metric captured by the collector 126 of the LMS 104. For example, the progression collector 134 may collect individual progression metric for some or all of the learners 108-114, directly from the various instances of the team-enhanced LMS UI 106. In such example implementations, as described in more detail below, the progression collector 134 may collect the individual progression metric using either LMS standard or proprietary protocols. In other example implementations, the progression collector 134 may simply obtain necessary individual progression metric directly from the collector 126 (or appropriate associated data store) of the LMS 104.

Meanwhile, a team dynamics collector 136 may be configured to collect metrics characterizing internal relationships, relative contributions, and other interaction characteristics exhibited by a given team of learners. In general, such team dynamics may be defined independently of a specific type of content stored within the content 130 of the LMS 104, although some implementations may define one or more team dynamic metrics as being specific to certain course material or type of course material. By way of more specific example, metrics may be established for determining a most frequent or most valuable contributor, a team member who advances most quickly, or a team member who is an expert on one or more included topics.

Meanwhile, a team builder 138 may be configured to construct, identify, and track constructed teams, using a team repository 140. Thus, the team builder 138 should be understood to be associated with the team generator 116 of the team-enhanced LMS UI 106. As already described with respect to the team generator 116, teams may be constructed in a variety of manners. For example, individual learners may be permitted authorization to construct teams from among themselves, or may be assigned to teams by an administrator or appropriate algorithm. In some implementations, teams may be long-running, e.g., for a duration of a course in a school setting. In other implementations, however, teams may be constructed on a short-term basis, e.g., may be established for a single session in which all of the participating learners have been authenticated for login to the LMS 104.

In some implementations, the team builder 138 may simply be responsible for identifying membership of each team, using the team repository 140. In other implementations, the team builder 138 may be configured to store team-related information that cannot be stored using the LMS 104, e.g., due to a use of a proprietary, non-standard compliant protocol in collecting associated team-related metric.

Thus, in operation, the team builder 138 identifies specific teams of learners, the progression collector 134 collects progression metric for each learner, regardless of team membership, and the team dynamics collector 136 collects team-related progression metric for each included team. Then, a team aggregator 142 provides a rule engine for computing aggregated team progressions, based on inputs received from the progression collector 134, the team dynamics collector 136, and/or the team builder 138.

More specifically, as described below with respect to FIG. 3, the team aggregator 142 may execute one or more appropriate algorithms and associated aggregation criteria for combining the various individual and team metrics. For example, in a scenario in which the learners 108, 110 form a first team, the team aggregator 142 may calculate a team score for a given aspect of a progression of the learners 108, 110 by using an appropriate algorithm.

More particularly, many different aggregation techniques may be used, some of which are described in more detail below. For example, the team aggregator 142 may apply more or less weight to a progression of one of the learners 108, 110, relative to the other. In some scenarios, a defined number or percentage of team members may be required to accomplish a certain objective, before recognizing the associated achievement at a team level.

With respect to metrics obtained from the team dynamics collector 136, the team aggregator 142 may be configured to calculate a number of percentage of contribution of a given team member, relative to all other team members. The team aggregator 142 may also calculate a number of times that a pair of team members communicated with one another during completion of a portion of a course, and other calculated metrics characterizing a type or degree of social interactions displayed within each team, as the team progressed through available coursework.

Thus, it may be appreciated that the LMS team manager 102 provides the virtual learner 115, including team level progression metrics calculated by the team aggregator 142. As described, the team aggregator 142 may calculate and provide such team-related progression metrics in a manner that is completely compliant with the SCORM standard, or any other standard or protocol implemented by the LMS 104. Consequently, as described above, the virtual learner 115, i.e., an entry for the virtual learner 115, may be stored within the learner repository 124, and scores and other progression metrics for the virtual learner 115 may be calculated by the score generator 128.

Consequently, the rendering engine 132, when providing otherwise-conventional renderings of the LMS 104, will inherently or unnecessarily provide or include renderings of scores and other progression metrics for the virtual learner 115. Thus, as referenced above, the LMS results 120 within the team-enhanced LMS UI 106 will include the team-based result, even though the LMS 104 is not itself configured to provide team-based results.

Thus, as described above, the rendering engine 132 of the LMS 104 is configured to provide the displayed content 118 and the LMS results 120, including, as just described, LMS results reflecting inclusion of the virtual learner 115 representing a corresponding team tracked by the LMS team manager 102. In order to render further aspects of the team-enhanced LMS UI 106, the LMS team manager 102 includes a rendering engine 144 that may be configured to render additional elements, e.g., the team generator 116 and the team results 122, based on team-based progression metrics determined by the LMS team manager 102. For example, the rendering engine 144 may render the team results 122 as including various internal team dynamics that have been collected by the team dynamics collector 136, as described above. In example implementations, the rendering engine 144 may obtain an output of the rendering engine 132, and may include such outputs of the rendering engine 132, in conjunction with whatever elements are rendered by the rendering engine 114 itself, within the team-enhanced LMS UI 106. In this way, the various learners 108-114 may be provided with a convenient, seamless user interface experience, while being provided with both the feature-rich, standardized output of the LMS 104, as well as the team-based progression metric provided by the LMS team manager 102.

In the example of FIG. 1, the LMS team manager 102 is illustrated as being executed using at least one computer 146, which itself includes at least one processor 148, as well a non-transitory computer readable storage medium 150. That is, as should be apparent, the at least one computer 146 represents one or more computers, connected by an appropriate network, as needed, and each including one or more processors, perhaps executing in parallel.

Although the LMS 104 is illustrated separately in FIG. 1, it may be appreciated that the LMS 104 may be executed using at least one computer 146. In all such implementations, the LMS team manager 102 and the LMS 104 are provided as backend server computers that provide the team-enhanced LMS UI 106 to available, corresponding client platforms being accessed by individual ones of the learners 108-114, although the various client platforms are not explicitly illustrated in the example of FIG. 1, for the sake of conciseness.

Further for purposes of conciseness, it will be appreciated that, as referenced above, none of the LMS team manager 102, the LMS 104, the team-enhance LMS UI 106 should be understood to include a complete or exhaustive illustration of components that might be included therein. For example, various types of data or data repositories are illustrated in FIG. 1, but it should be appreciated that other types of data repositories might be utilized. For example, aggregation criteria may be stored for access by the team aggregator 142.

In this regard, it may be appreciated that, in addition to storing instructions which, when processed by the at least one processor 148, provide the features and functions of the LMS team manager 102 as described herein, the computer readable storage medium 150 may be utilized to store the aggregation criteria, the team repository 140, and various other types of code and/or data that may be utilized by the system 100. Further in FIG. 1, although various elements are illustrated as separate, individual components, it will be appreciated that any two or more such components may be combined, where appropriate or desired, for execution as a single component. Conversely, any illustrated component may be executed as two or more subcomponents.

Figure 2:
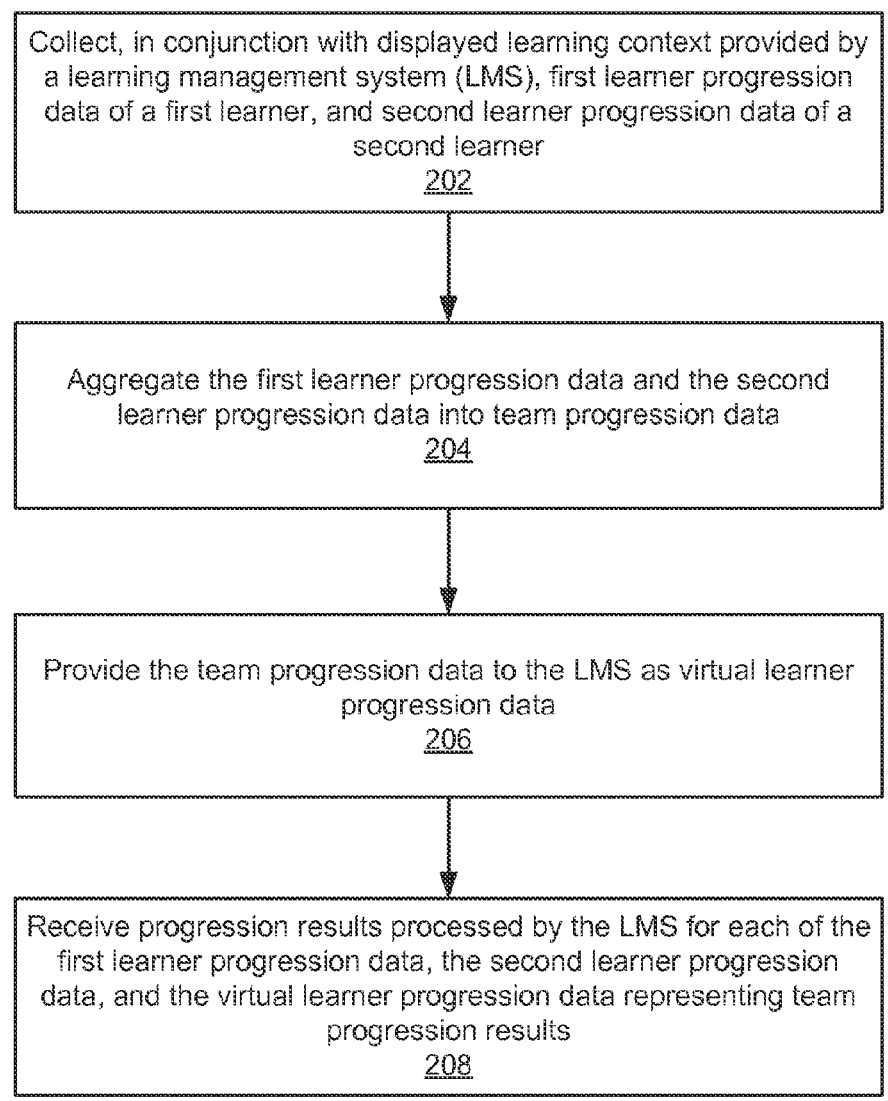
FIG. 2 is a flowchart illustrating example operations of the system of FIG. 1.

FIG. 2 is a flowchart 200 illustrating example operations of the system 100 of FIG. 1. In the example of FIG. 2, operations 202-208 are illustrated as separate, sequential operations. However, in additional or alternative implementations, one or more operations may be substituted or included, and the various operations may be executed in a parallel, nested, iterative, looped, or branched fashion.

In the example of FIG. 2, in conjunction with displayed learning content provided by a learning management system (LMS), first learner progression data of a first learner and second learner progression data of a second learner may be collected (202). For example, the progression collector 134 may collect progression data for the learners 108, 110, with respect to the displayed content 118 provided by the LMS 104.

As described above, the collected progression data may be obtained directly by way of interface with the team-enhanced LMS UI 106, or may be obtained through interaction with the LMS 104 itself. In this context, the term progression should be understood generally to describe any interaction between one or more of the learners 108-114 with the team-enhanced LMS UI 106 that advances the various learners from a beginning of course content to an end of the course content. Consequently, for example, the term progression should include a quantity or percentage of total course content received by a given learner, a number of responses provided by the learner, a characterization of a performance of the learner, a record of interactions of the learner with the provided content and with other learners, a completion by the learner of a defined portion, section, or learning unit of the provided content, and any other description or characterization of interactions of the learner with the provided content.

The first learner progression data and the second learner progression data may be aggregated into team progression data (204). For example, the team aggregator 142 may be configured to combine or otherwise aggregate progression results for the learners 108-110, in example scenarios in which the learners 108, 110 are included within a single team defined by the team builder 138 and stored within the team repository 140. More detailed examples of manners in which the individual learner progression data may be combined by the team aggregator 142 are provided below, e.g., with respect to FIG. 3.

The team progression data may be provided to the LMS as virtual learner progression data (206). For example, the team aggregator 142 may be configured to formulate the aggregated team progression data in compliance with one or more LMS standards being used by the LMS 104, to thereby inject the virtual learner 115 progression data into the LMS 104, utilizing otherwise-conventional inputs and interfaces of the LMS 104. That is, for example, the team aggregator 142 is not required to calculate a score or other result data for the team in question. Rather, the team aggregator 142 may simply combine or otherwise aggregate the progression data of the included individual learners, to thereby obtain progression data that is identical for purposes of the LMS 104 to progression data that may be collected by the collector 126 for individual learners. In this way, as referenced above, the LMS 104, e.g., the score generator 128, may proceed to calculate a score and any other calculated progression-related result metric that may be included within the LMS results 120.

Thus, progression results processed by the LMS may be received for each of the first learner progression data, the second learner progression data, and the virtual learner progression data representing team progression results (208). For example, the rendering engine 144 may receive, as just referenced, results from the score generator 128 of the LMS 104 for individual learners, as well as for the virtual learner 115 representing a combination of virtual learners corresponding to a team of the team repository 140. As may be appreciated, the rendering engine 144 may receive such progression results from the rendering engine 132 of the LMS 104, so that the LMS 104, as referenced above, is permitted to operate in an entirely normal or standard fashion, e.g., by rendering result data in a manner identical to the rendering that would normally be performed by the LMS 104 in scenarios in which the LMS 104 is operating independently of the LMS team manager 102.

It will be appreciated that FIG. 2 represents a generalized, high-level view of example operations of the system 100 of FIG. 1, and, as referenced above, many additional or alternative operations or sub-operations may be included in further example implementations, some of which are referenced above in the context of FIG. 1. For example, as referenced above and described in more detail below, the rendering engine 144 may also receive team dynamics data from the team dynamics collector 136, which may be provided in a proprietary protocol that need not be compliant with the LMS standards and associated protocols used by the LMS 104. Then, the rendering engine 144 may be configured to seamlessly blend rendered representations of the collected team dynamics data with the LMS results received from the rendering engine 132 of the LMS 104.

Figure 3:
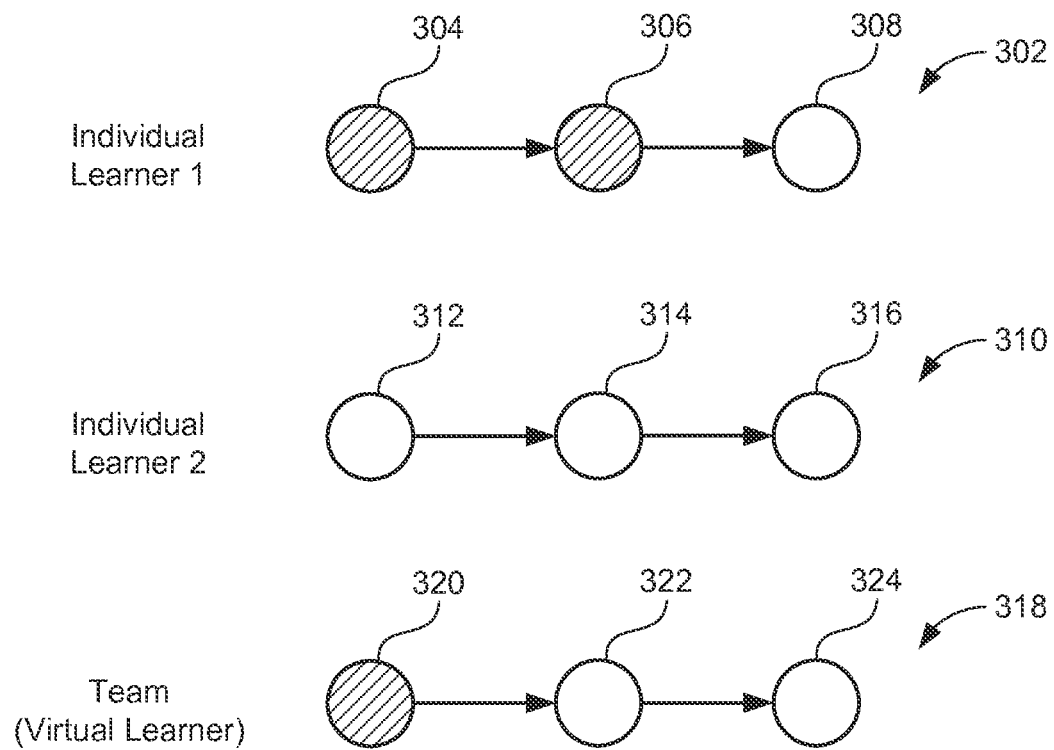
FIG. 3 illustrates a first example screenshot demonstrating individual and team progression with respect to completion of relevant learning content.

FIG. 3 illustrates an example implementation of individual learner progression data and associated, aggregated team progression data. As illustrated, in the example, individual progression data 302 for a first learner is illustrated as including a first learning unit 304, a second learning unit 306, and a third learning unit 308. More specifically, as shown, nodes 304, 306, 308 correspond to associated learning units, and a node that is filled in represents a completed learning unit, while a node that is empty or not filled in represents a learning unit that has not yet been completed. Thus, in the example of FIG. 3, it should be appreciated that the first progression data 302 for a first individual learner indicates that the learner in question has completed learning units associated with nodes 304, 306, but has not completed the learning unit associated with the node 308.

Further in FIG. 3, a second individual learner is associated with progression data 310. In the progression data 310 for the second individual learner, nodes 312, 314, 316 correspond respectively to the same learning units represented by the nodes 304, 306, 308, but identified with the second individual learner. As shown, the progression data 310 indicates that the second individual learner has not completed any of the associated learning units. Also, as described above, the individual learner progression data 302, 310 may be obtained by the progression collector 134 for individual learners, e.g., the individual learners 108, 110, and may be collected directly from the team-enhanced LMS UI 106, or from the collector 126 of the LMS 104.

Then, the team aggregator 142 may determine from the team builder 138 and the team repository 140 that the individual learners of FIG. 3 associated with the progression data 302, 310 are included together within an existing team. As a result, the team aggregator 142 may determine team progression data 318, including node 320 (corresponding to the same learning unit of the nodes 304, 312), the node 322 (corresponding to the same learning unit of the nodes 314, 306), and the node 324 (corresponding to the same learning unit of the nodes 316, 308).

As illustrated in FIG. 3, the team progression data 318 thus indicates an average or collective progression of the team in question as including completion of only the node 320 associated with the first learning unit. Thus, by way of similar example, in a case where three individual learners are included within a team, it may occur that the first two learners have completed 100% of a course or of an individual achievement or other learning unit, while the third individual learner may not have started course work (i.e., has completed 0% of the course work). In this case, the team aggregator 142 might determine that the team as a whole has completed 75% of the relevant course or course achievement.

Of course, as referenced above, various other additional aggregation techniques may be utilized. For example, in scenarios in which relevant aggregation criteria and algorithms specify that team progression should be calculated based on a current highest achievement level of an included learner, the team aggregator 142 would calculate the team progression data 318 of FIG. 3 as indicating team-level completion of both of the learning units represented by the nodes 320, 322, since the first learner progression data 302 indicates completion by the first learner of both learning units represented by the nodes 304, 306.

Regardless of the aggregation techniques utilized, it may be appreciated that the individual learner progression data 302, 310 may be processed by the LMS 104, e.g., by the score generator 128, in a normal or standardized fashion. Moreover, FIG. 3 also illustrates that the team progression data 318 is also represented in a form and format that is substantially identical to that used for the individual learner progression data 302, 310, and/or that is entirely compatible with relevant standards and associated protocols used by the LMS 104, i.e., by the collector 126.

Figure 4:
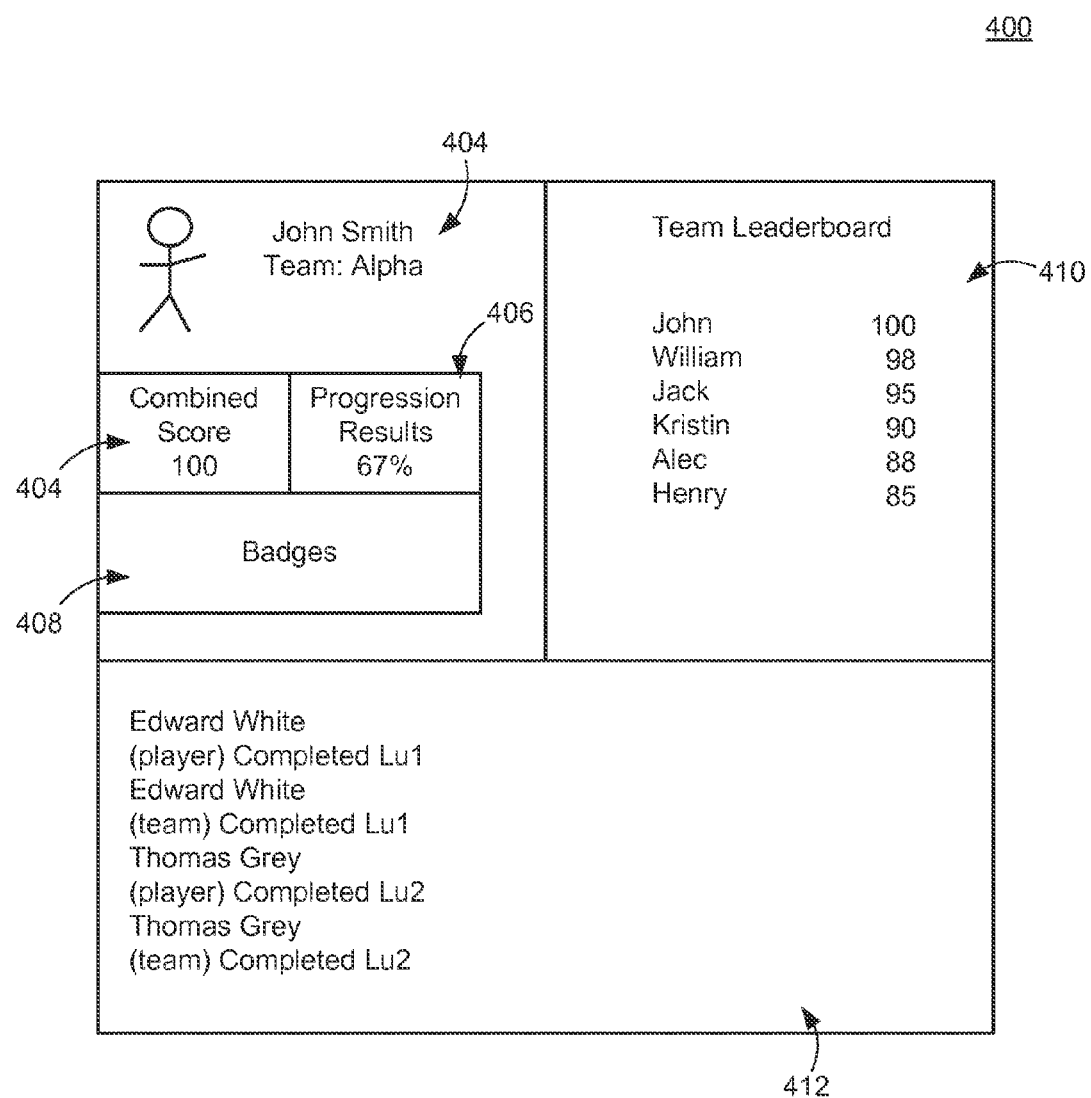
FIG. 4 is a second example screenshot illustrating individual and team performance.

FIG. 4 is a screenshot 400 illustrating an example portion of the team-enhanced LMS UI 106. Specifically, it will be appreciated from the below description that the screenshot 400 may correspond to the LMS results 120 and the team results 122 of FIG. 1, as rendered by the rendering engine 144, and including progression results for individual learners and virtual learners representing teams, as provided by the rendering engine 132 of the LMS 104.

In the example of FIG. 4, a portion 402 identifies an individual learner and a team which includes the individual learner. Within the portion 402, a further portion 404 indicates a combined score of the user of the portion 402. In the example of FIG. 4, a combined score of 100 is illustrated. In various examples, the combined score may be understood to represent an individual score of the identified user, augmented by one or more team-related scores.

For example, with reference back to FIG. 3, the identified learner of the portion 402 may represent the learner associated with the first progression data 302. Then, the identified learner may receive a certain score calculated by the score generator of the LMS 104, and representing individual progress of the identified learner. At the same time, the combined score of section 404 may include additional points awarded to the identified learner by the team aggregator 142, based on the fact that, in the example, the identified learner is currently the team member that is closest to course completion. Thus, in these and other examples, it may be appreciated that the combined score of the portion 404 recognizes efforts and other contributions of the identified learner of the portion 402, relative to other learners within the same team, such as may be determined by the team dynamics collector 136 of FIG. 1.

In additional or alternative implementations, the combined score of the portion 404 may reflect other positive or negative adjustments made to an individual score of the identified learner, based on other included aspects of team dynamics data collected by the team dynamic collector 136. For example, the combined score of the portion 404 may reflect increases or decreases of an individual score, based on, e.g., a relative number or type of contributions of the individual learner, including non-content related criteria such as a number of interactions of the individual learner with other team members.

Further within the portion 402, individual progression scores or metrics, specific to the identified learner of the portion 402, may be provided. For example, as shown, a portion 406 may include progression results for the identified learner. In the example, and with respect to FIG. 3, the progression results of the portion 406 indicate a progression completion of 67%, corresponding to the first learner progression data 302 of FIG. 3.

Further, in a portion 408, badges or other achievement recognition may be provided. For example, such badges may include a badge for fastest completion time, high successful completion percentages, number of courses completed successfully, and virtually any other type of recognition that may be awarded to the identified learner for his or her interaction with an individual course, with the LMS 104 as a whole (e.g., with respect to multiple courses), and/or with respect to other team members (i.e., through reliance on team dynamics data collected by the team dynamics collector 136).

Meanwhile, a portion 410 includes a team leaderboard, in which remaining members of the team of the identified individual of the portion 402 may be listed. In the example, the various team members are ranked according to their respective combined scores. As shown, in the example, the identified learner of the portion 402 is ranked most highly within the team leaderboard of the portion 410, based on the combined score of the portion 404.

In various implementations, individual learners may be granted desired levels of access to available progression data. For example, in some implementations, the identified learner of the portion 402 may be permitted to select the combined score of the portion 404, and thereby be provided with a breakdown of how the combined score was calculated. Similarly, in some example implementations, the identified learner of the portion 402 may be granted authorization to select an individual combined score of any team member included within the team leaderboard 410, to thereby view a breakdown of how the selected individual combined score was calculated.

On the other hand, in other implementations, the team leaderboard of the portion 410 need not be made accessible to individual learners. Instead, rather than disclosing specific individual combined scores, each learner may simply be provided with his or her relative standing within the team. In still other implementations, some learners, such as a team leader or administrator, may be provided with a higher level of access to individual progression data than may be granted to other team members.

Finally in FIG. 4, a portion 412 provides a reporting of individual progression data, correlated with team progression data. For example, the portion 412 may include real-time or near real-time updates reflecting progression of an individual learner. For example, such updates may be provided for an individual learner who is a member of the same team as the identified learner of portion 402, although, in the example of FIG. 4, the identified learners may not have combined scores sufficiently high enough to be included on the team leaderboard of the portion 410. In additional or alternative implementations, the portion 412 may include updates for individuals on one or more different teams than the team of the identified individual within the portion 402, to thereby update the identified individual learner on a current progress of competing teams.

Thus, as shown in FIG. 4, an individual may be reported as having completed a particular learning unit, e.g., LU1, and the reporting of this accomplishment may be made with respect to the individual, as well as with respect to a team of which the individual learner is a member. Again, as referenced above, varying levels of access may be granted. For example, individual progression data for individuals of a same or different team may be presented in an anonymized fashion, in order to provide relevant information while not disclosing individual results that may be desired to be maintained in privacy by a given individual learner. Such variations and levels of access may be granted on a team by team basis, or may even vary for individuals within a specific team, based on individual preference.

Of course, various types of additional information may be included within the updates of the portion 412. For example, a timestamp may be provided in conjunction with each reported completion event. In other examples, a cumulative effect of the reported completion event on a combined score of the learner in question may be provided. In other implementations, any of the names included within the team leaderboard of the portion 410 for the reported updates of the portion 412 may be provided as active hyperlinks, so that the identified learner of the portion 402 may select an individual. In this way, for example, the identified learner of the portion 402 may be provided access to further information regarding a selected individual, and/or may be provided with an opportunity to communicate with the selected individual.

Figure 5:
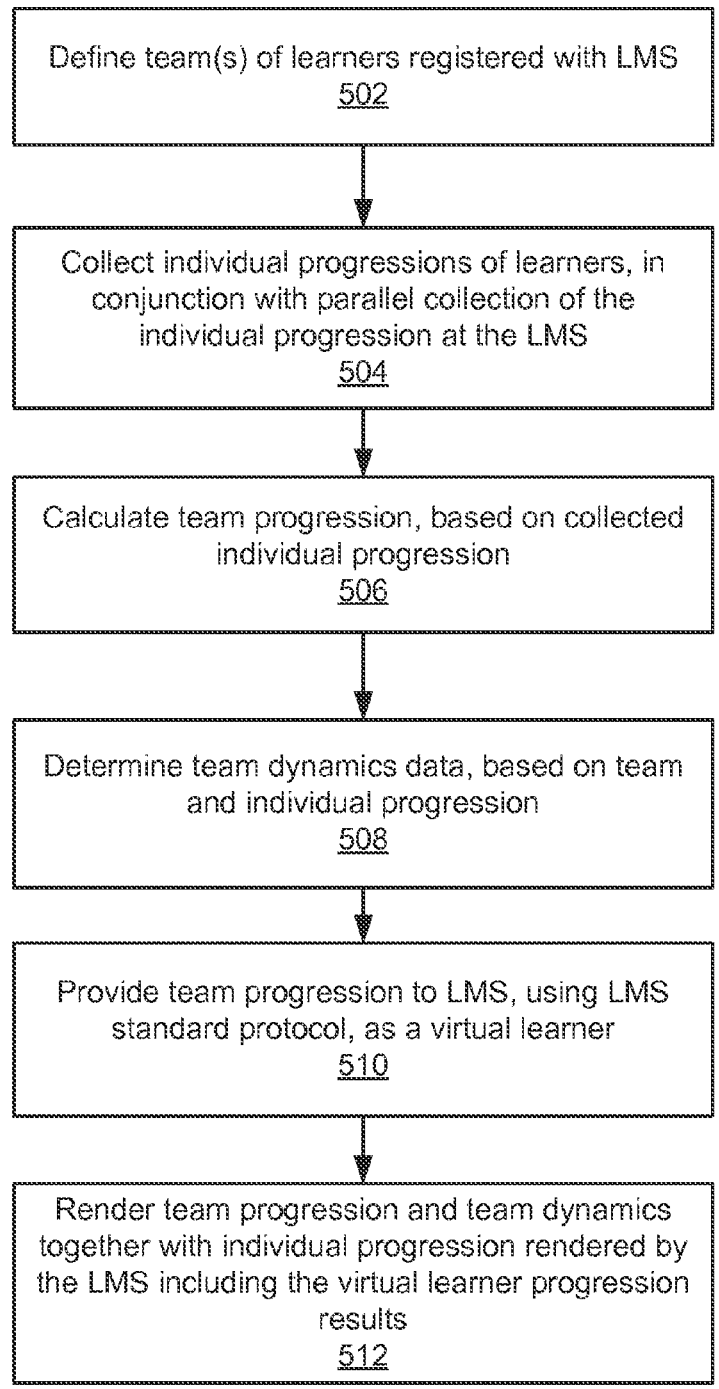
FIG. 5 is a flowchart illustrating more detailed example operations of the system of FIG. 1.

FIG. 5 is a flowchart 500 illustrating more detailed example operations of the system 100 of FIG. 1. In the example of FIG. 5, teams of learners registered with the LMS 104 may be defined (502). For example, the team builder 138 may be configured to receive or otherwise determine teams defined with respect to the learners 108-114 within the learner repository 124, for storage of such teams and related information within the team repository 140.

Individual progression of learners may be collected, in conjunction with parallel collection of the individual progressions at the LMS 104 (504). For example, as described, the progression collector 134 may collect individual progression data for the learners 108-114, in conjunction with collection of the same individual progression data by the collector 126 of the LMS 104. In some implementations, the progression data 134 may use a non-standard or proprietary protocol to collect some or all of the collected individual progression data. For example, the LMS team manager 102 may be designed so that the progression collector 134, the team dynamics collector 136 collect data from the team-enhanced LMS UI 106 in a unified fashion, using a proprietary protocol. Nonetheless, as described herein, the team aggregator 142 may be configured to collect relevant portions of the individual progression data collected by the progression collector 134 into a form and format compliant with one or more standards and associated protocols used by the LMS 104.

Team progression may be calculated, based on collected individual progressions (506). As described, the team aggregator 142 may calculate a combined or otherwise aggregated characterization of an overall team progression, based on associated aggregation criteria, and expressed in a manner that is compatible with interactions of the LMS 104.

Then, in conjunction with the above operations, team dynamics data may be determined, based on team and individual progression (508). For example, the team dynamics collector 136 of FIG. 1 may collect interaction events for individual ones of the learners 108-114, which have been defined or otherwise determined as being potentially relevant to internal team interactions or internal relative performances of team members. As described, such team dynamics data may be non-content specific. For example, team dynamics data may be defined in a manner that is applicable to multiple different types of courses included within the content 130 of the LMS 104. Therefore, advantageously, the team dynamics collector 136 may be configured to in a manner that permits a straightforward deployment thereof within many different types of courses, and in many different types of deployment scenarios associated with the LMS 104 (e.g., within multiple deployment scenarios within different divisions of a large corporation, or within multiple deployment of different university level courses within a university).

Specifically, such aggregated team progression data may be provided to the LMS 104 in the form of the virtual learner 115 (510). For example, progression data for the individual virtual learner 115 may be collected by the collector 126 of the LMS 104, in an otherwise standard fashion.

Finally in FIG. 5, a team progression and team dynamics may be rendered together with individual progression rendered by the LMS 104, including the virtual learner progression results (512). For example, the rendering engine 144 of FIG. 1 may receive rendered progression results from the rendering engine 132 of the LMS 104, including rendered results for the virtual learner 115, and may thereafter render the team-enhanced LMS UI 106, including the various example portions of the screenshot 400 of FIG. 4.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system comprising:
   at least one processor; and
   instructions recorded on a non-transitory computer-readable medium, and executable by the at least one processor, the system including
   a progression collector configured to collect, in conjunction with displayed learning context provided by a learning management system (LMS) and based on a protocol format used by the LMS, first learner progression data of a first learner, and second learner progression data of a second learner, the progression collector being further configured to submit each of the first learner progression data and the second learner progression data for processing by the LMS using a learner submission process and in accordance with the protocol format;
   a team aggregator configured to aggregate the first learner progression data and the second learner progression data into team progression data represented using the protocol format used by the LMS, and further configured to provide the team progression data to the LMS as virtual learner progression data, including submitting a virtual learner in accordance with the learner submission process and the protocol format; and
   a rendering engine configured to receive progression results processed by the LMS for each of the first learner progression data, the second learner progression data, and the virtual learner progression data representing team progression results,
   wherein the rendering engine is configured to receive, from a rendering engine of the LMS, rendered team progression results including first learner progression results, second learner progression results, and virtual learner progression results, and further configured to render the virtual learner progression results in conjunction with an identification of the virtual learner progression results as the team progression results, within a team-enhanced LMU user interface (UI),
   and wherein the rendering engine is further configured to blend rendered results from the rendering engine of the LMS with rendered team dynamics data representing non-content contributions of the first learner and the second learner.

2. The system of claim 1, comprising a team builder configured to define the first learner and the second learner as a team with respect to the team progression results.

3. The system of claim 1, wherein the progression collector is configured to collect the first learner progression data and the second learner progression data from the team-enhanced LMS user-interface (UI).

4. The system of claim 1, wherein the progression collector is configured to collect the first learner progression data and the second learner progression data from the LMS.

5. The system of claim 1, comprising a team dynamics collector that is configured to collect the team dynamics data characterizing non-content contributions of the first learner and the second learner.

6. The system of claim 1, comprising a team dynamics collector that is configured to collect the team dynamics data characterizing relative contributions of the first learner and the second learner.

7. The system of claim 1, comprising a team dynamics collector that is configured to collect the team dynamics data that is proprietary with respect to the protocol format used to implement the LMS.

8. The system of claim 1, wherein the team aggregator is configured to provide the team progression data as an averaged value of the first learner progression data and the second learner progression data.

9. A computer-implemented method for executing instructions stored on a non-transitory computer readable storage medium, the method comprising:
   collecting, in conjunction with displayed learning context provided by a learning management system (LMS) and based on a protocol format used by the LMS, first learner progression data of a first learner, and second learner progression data of a second learner, the progression collector being further configured to submit each of the first learner progression data and the second learner progression data for processing by the LMS using a learner submission process and in accordance with the protocol format;
   aggregating the first learner progression data and the second learner progression data into team progression data represented using the protocol format used by the LMS;
   providing the team progression data to the LMS as virtual learner progression data, including submitting a virtual learner in accordance with the learner submission process and the protocol format;

receiving progression results processed by the LMS for each of the first learner progression data, the second learner progression data, and the virtual learner progression data representing team progression results, receiving, from a rendering engine of the LMS, rendered team progression results including first learner progression results, second learner progression results, and virtual learner progression results;

rendering the virtual learner progression results in conjunction with an identification of the virtual learner progression results as the team progression results, within a team-enhanced LMU user interface (UI); and blending rendered results from the rendering engine of the LMS with rendered team dynamics data representing non-content contributions of the first learner and the second learner.

10. The method of claim 9, comprising collecting the team dynamics data characterizing non-content contributions of the first learner and the second learner.

11. A computer program product, the computer program product being tangibly embodied on a non-transitory computer-readable storage medium and including instructions that, when executed, are configured to cause at least one processor to:

collect, in conjunction with displayed learning context provided by a learning management system (LMS) and based on a protocol format used by the LMS, first learner progression data of a first learner, and second learner progression data of a second learner, the progression collector being further configured to submit each of the first learner progression data and the second learner progression data for processing by the LMS using a learner submission process and in accordance with the protocol format;

aggregate the first learner progression data and the second learner progression data into team progression data represented using the protocol format used by the LMS;

provide the team progression data to the LMS as virtual learner progression data including submitting a virtual learner in accordance with the learner submission process and the protocol format;

receive progression results processed by the LMS for each of the first learner progression data, the second learner progression data, and the virtual learner progression data representing team progression results, receive, from a rendering engine of the LMS, rendered team progression results including first learner progression results, second learner progression results, and virtual learner progression results;

render the virtual learner progression results in conjunction with an identification of the virtual learner progression results as the team progression results, within a team-enhanced LMU user interface (UI); and blend rendered results from the rendering engine of the LMS with rendered team dynamics data representing non-content contributions of the first learner and the second learner.

12. The computer program product of claim 11, wherein the instructions, when executed by the at least one processor are further configured to collect the first learner progression data and the second learner progression data from the team-enhanced LMS user-interface (UI).

13. The computer program product of claim 11, wherein the instructions, when executed by the at least one processor are further configured to collect the team dynamics data characterizing non-content contributions of the first learner and the second learner.

14. The computer program product of claim 11, wherein the instructions, when executed by the at least one processor are further configured to collect the team dynamics data characterizing relative contributions of the first learner and the second learner.

* * * * *